United States Patent
Mitchell

[11] 3,865,170
[45] Feb. 11, 1975

[54] WHEELS AND PNEUMATIC TIRE AND WHEEL ASSEMBLIES

[75] Inventor: William E. Mitchell, Conventry, England

[73] Assignee: Dunlop Limited, London, England

[22] Filed: June 7, 1972

[21] Appl. No.: 260,462

[30] Foreign Application Priority Data
June 16, 1971 Great Britain............... 28097/71

[52] U.S. Cl.......... 152/386, 152/379 R, 152/381 A, 152/388, 152/399, 152/405, 152/409, 301/11 CD
[51] Int. Cl..... B60b 23/10, B60c 5/16, B60c 19/00
[58] Field of Search .......... 152/376, 379, 380, 381, 152/382, 383, 384, 385, 386, 391, 405, 406, 152/407, 408, 409, 410, 411, 412, 413, 414, 152/379 R, 379 S, 381 R, 381 A, 388, 399; 301/11 CD

[56] References Cited
UNITED STATES PATENTS

| 1,639,108 | 8/1927 | Putnam............................. 152/405 |
| 1,939,935 | 12/1933 | Wagenhorst....................... 152/406 |
| 2,405,954 | 8/1946 | Hollerith............................ 152/381 |
| 3,006,692 | 10/1961 | Schubert........................... 152/413 X |
| 3,007,507 | 11/1961 | Sinclair et al..................... 152/413 X |
| 3,229,744 | 1/1966 | Bradley.............................. 152/381 |
| 3,708,847 | 1/1973 | Mitchell............................ 152/379 |

FOREIGN PATENTS OR APPLICATIONS

| 348,883 | 10/1960 | Switzerland....................... 152/379 |
| 824,462 | 12/1959 | Great Britain..................... 152/405 |
| 1,172,562 | 6/1964 | Germany............................ 105/381 |

Primary Examiner—M. Henson Wood, Jr.
Assistant Examiner—Howard Beltran
Attorney, Agent, or Firm—Stevens, Davis, Miller & Mosher

[57] ABSTRACT

A rim for a pneumatic tire comprises two rim parts. The first rim part consists of a rim flange and associated bead seat and a radially inwardly extending attachment flange portion adjacent the toe of the bead seat. The second rim part consists of a bead retaining flange positioned at one side and a radially inwardly extending attachment flange at the other side with a flat rim base portion positioned therebetween. The two rim parts are secured together with a sealing ring sandwiched between them, the sealing ring extends continuously around the joint between the rim parts and projects radially outwardly in order to engage an adjacent tire bead thereby resisting axially inward movement of the bead from the bead seat.

8 Claims, 5 Drawing Figures 3,865,170

WHEELS AND PNEUMATIC TIRE AND WHEEL ASSEMBLIES

This invention relates to wheels and pneumatic tire and wheel assemblies and particularly to a wheel having a "flat-base" rim of generally cylindrical form on which a pneumatic tire may be detachably or permanently mounted.

One object of the invention is to provide a substantially flat-base rim for a pneumatic tire which comprises means for preventing axial displacement of at least one of the tire beads.

According to the invention a rim for a pneumatic tire comrpises a first rim part comprising a rim flange and associated bead seat and a radially inwardly extending attachment flange portion adjacent the toe of the bead seat, and a second rim part having a bead retaining flange at one side and a radially inwardly extending attachment flange at the other side, the rim parts being secured together with a sealing ring sandwiched between the rim parts so as to extend continuously around the joint between the rim parts and projecting radially outwardly for engagement with an adjacent tire bead so as to resist axially inward movement of the adjacent tire bead from the bead seat.

The rim parts may be secured to one another by means of bolts and nuts which clamp the respective attachment flanges together; alternatively the attachment flanges may be rivetted together to form a semi-permanent assembly.

Two embodiments of the invention will now be described by way of example with reference to the accompanying drawings in which.

Figure 1:
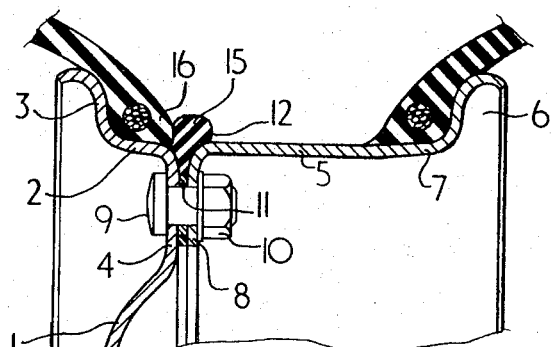
FIG. 1 is a cross-sectional view of a part of a wheel and tire assembly in accordance with the first embodiment of the invention.
Figure 2:
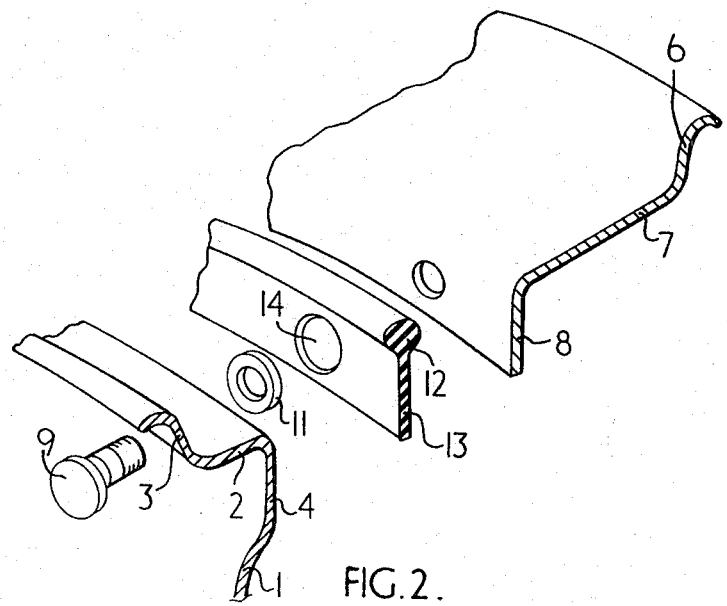
FIG. 2 is an exploded perspective view of the first embodiment of the invention.

In a first embodiment shown in FIGS. 1 and 2 a wheel comprises a disc portion 1 of generally conventional form extending at its outer periphery to provide, on the outboard side of the wheel relative to its normal position when fitted to a vehicle, a tire bead seat 2 and flange portion 3 which together constitute a first rim part. The outer periphery of the wheel disc 1 extends in a radial plane to provide an attachment flange portion 4 for securing a second rim part 5 to the disc portion.

The second rim part is formed with a bead retaining flange 6 and bead seat 7 at one side of the rim part, and is of flat-base, i.e. cylindrical form, having at its other side a radially inwardly extending attachment flange 8. The attachment flanges (4 and 8) of the two rim parts are provided with captive bolts 9 and associated nuts 10 to secure the two rim parts together. The two rim parts are arranged to be held slightly apart from one another by spacing washers 11 located around the bolts 9 between the two attachment flanges 4 and 8, and a resilient elastomeric rubber sealing ring 12 is arranged to be sandwiched between the attachment flanges. The sealing ring 12 comprises a radially inwardly projecting tongue portion 13 which, apart from apertures 14 in the tongue portion provided to accommodate the spacing washers 11, extends continuously around the rim and is held under compression so as to fill the space between the two attachment flanges 4 and 8. The ring 12 projects radially outwardly to form a portion 15 of bulbous cross-section which engages the associated tire bead 16.

The rubber sealing ring 12 is held firmly in position between the two attachment flanges 4 and 8, and thus functions to prevent any accidental displacement, in an axial direction, of the associated tire bead 14 which may tend to occur on partial or complete deflation of the tire. The sealing ring 12 has the additional function of preventing the escape of inflation pressure through the joint between the two rim parts.

Figure 3:
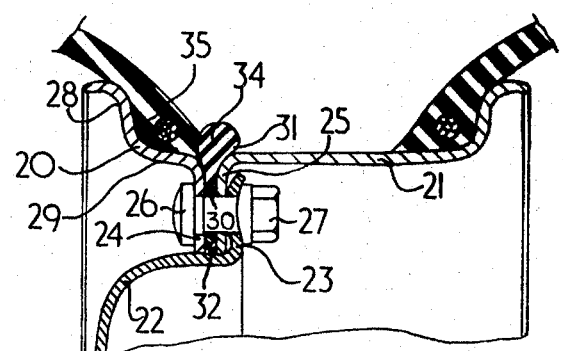
FIG. 3 is a cross-sectional view of part of a wheel rim assembly in accordance with the second embodiment of the invention.
Figure 4:
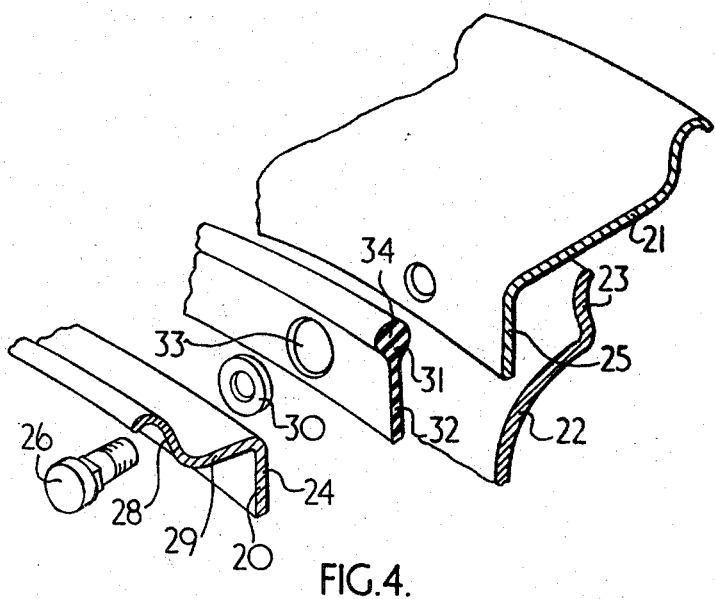
FIG. 4 is an exploded perspective view of the second embodiment of the invention.

In a second embodiment of the invention shown in FIGS. 3 and 4 both of the rim parts (20 and 21) are formed separately from the wheel disc portion 22 which is of generally conventional profile but is provided at its outer periphery with a short radially extending attachment flange 23, to which radially inwardly extending flanges 24 and 25 formed on both rim parts are secured by means of captive bolts 26 and associated nuts 27 as in the embodiment described above.

The outboard rim part 20 comprises a rim flange 28 and bead seat 29, the attachment flange 24 being positioned closely adjacent the bead seat 29, and the second rim part 21 is similar to that of the embodiment described above.

Figure 5:
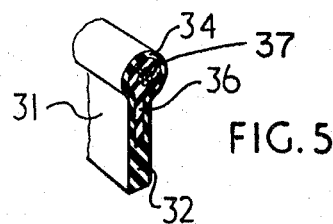
FIG. 5 is a perspective view of part of a reinforced sealing ring.

Spacing washers 30 are fitted between the attachment flanges 24 and 25 of the two rim parts 20 and 21, and a sealing ring 31 is sandwiched between the two attachment flanges, as also previously described. The sealing ring 31 comprises a radially inwardly projecting tongue portion 32 which, apart from apertures 33 in the tongue portion provided to accommodate the spacing washers 30, extends continuously around the rim and fills the space between the two attachment flanges 24 and 25, projecting radially outwardly to form a portion 34 of bulbous cross-section which engages the associated tire bead 35. In order to improve the rigidity of the sealing ring 31 and thus enhance its ability to prevent displacement of the outboard tire bead 35, the outwardly projecting portion may be reinforced with metal wires 37 or other reinforcing material (FIG. 5) embedded therein and extending circumferentially in the manner of a tire bead reinforcement. Further reinforcement, for example in the form of a layer 36 or layers of textile fabric may be incorporated in the tongue portion 32 of the sealing ring 21, and such a layer or layers may be wrapped around the reinforcement of the bulbous portion 34.

In both of the embodiments described above a wheel rim is provided which is suitable for use on light motor vehicles and which does not have the disadvantage that the space within the wheel for accommodation of a brake is obstructed by the conventional well portion of the rim.

Also, accidental displacement of the outboard tire bead in the event of partial or complete deflation of the tire is prevented, with a consequent improvement in safety.

I claim:

1. A rim for a tubeless pneumatic tire comprising a first rim part comprising a rim flange and associated bead seat and a radially inwardly extending attachment flange portion adjacent the toe of the bead seat, a second rim part having a bead retaining flange at one side and a radially inwardly extending attachment flange at the other side with a flat rim base portion positioned therebetween, means securing the rim parts along said attachment flanges, a resilient elastomeric sealing ring sandwiched therebetween so as to extend continuously around the joint between the rim parts, said resilient elastomeric sealing ring having a portion projecting radially outwardly for engagement with an adjacent tire bead so as to resist axially inward movement of the adjacent tire bead from the bead seat.

2. A rim according to claim 1 wherein the first rim part and second rim part are arranged to be detachably secured together by means of nuts and bolts passing through apertures provided around the circumference of the two attachment flanges.

3. A rim according to claim 2 wherein the two rim parts are kept slightly apart by spacing washers positioned around the bolts between the two attachment flanges to limit compression of said resilient elastomeric sealing ring.

4. A rim according to claim 1 wherein the resilient elastomeric sealing ring has a radially inwardly projecting tongue portion arranged to extend continuously around the rim and to fill the space between the attachment flanges of the rim parts.

5. A rim according to claim 4 wherein the radially projecting tongue portion is provided with apertures in order to accommodate spacing washers to limit compression of said resilient elastomeric sealing ring.

6. A rim according to claim 4 wherein the radially outwardly projecting portion of the resilient elastomeric sealing ring has a bulbous cross-section for engagement with an adjacent tire bead.

7. A rim according to claim 1 wherein the outwardly projecting portion of the resilient elastomeric sealing ring is reinforced with filamentary material embedded therein.

8. A rim according to claim 1 wherein a disc portion is provided with a short radially extending attachment flange to which the radially inwardly extending attachment flanges of the two rim parts are detachably attached by means of nuts and bolts passing through apertures positioned around the peripheries of the attachment flanges.

* * * * *